Aug. 27, 1963 P. H. SHERRON 3,102,184

TELEPHONE BOOTH HEATING MEANS

Filed Jan. 5, 1960 3 Sheets-Sheet 1

INVENTOR.
PERCIVAL H. SHERRON
BY
Busser, Smith & Harding
ATTORNEYS

*INVENTOR.*
PERCIVAL H. SHERRON
*BY*
Beusse, Smith & Harding
ATTORNEYS

TELEPHONE BOOTH HEATING MEANS

Filed Jan. 5, 1960 3 Sheets-Sheet 3

INVENTOR.
PERCIVAL H. SHERRON
BY
Busser, Smith & Harding
ATTORNEYS

United States Patent Office 3,102,184

Patented Aug. 27, 1963

3,102,184
TELEPHONE BOOTH HEATING MEANS

Percival H. Sherron, Jamaica, N.Y. (% Sherron Metallic Corp., 1201 Flushing Ave., Brooklyn 37, N.Y.)
Filed Jan. 5, 1960, Ser. No. 546
4 Claims. (Cl. 219—34)

This invention relates generally to telephone booths, and more particularly to means for heating an outdoor telephone booth.

An object of the invention is to provide improved means for heating an outdoor telephone booth.

Another object is to incorporate such means in the booth as a permanent part thereof without encroaching upon the available space within the booth.

Another object is to conceal such means within the ceiling structure of the booth.

Another object is to install such means in the side walls or other parts of the booth structure.

Another object is to control such means by a door switch which is dominated by a thermostat.

Other objects of the invention will become apparent as the following description is read with reference to the accompanying drawings, in which.

Figure 1:
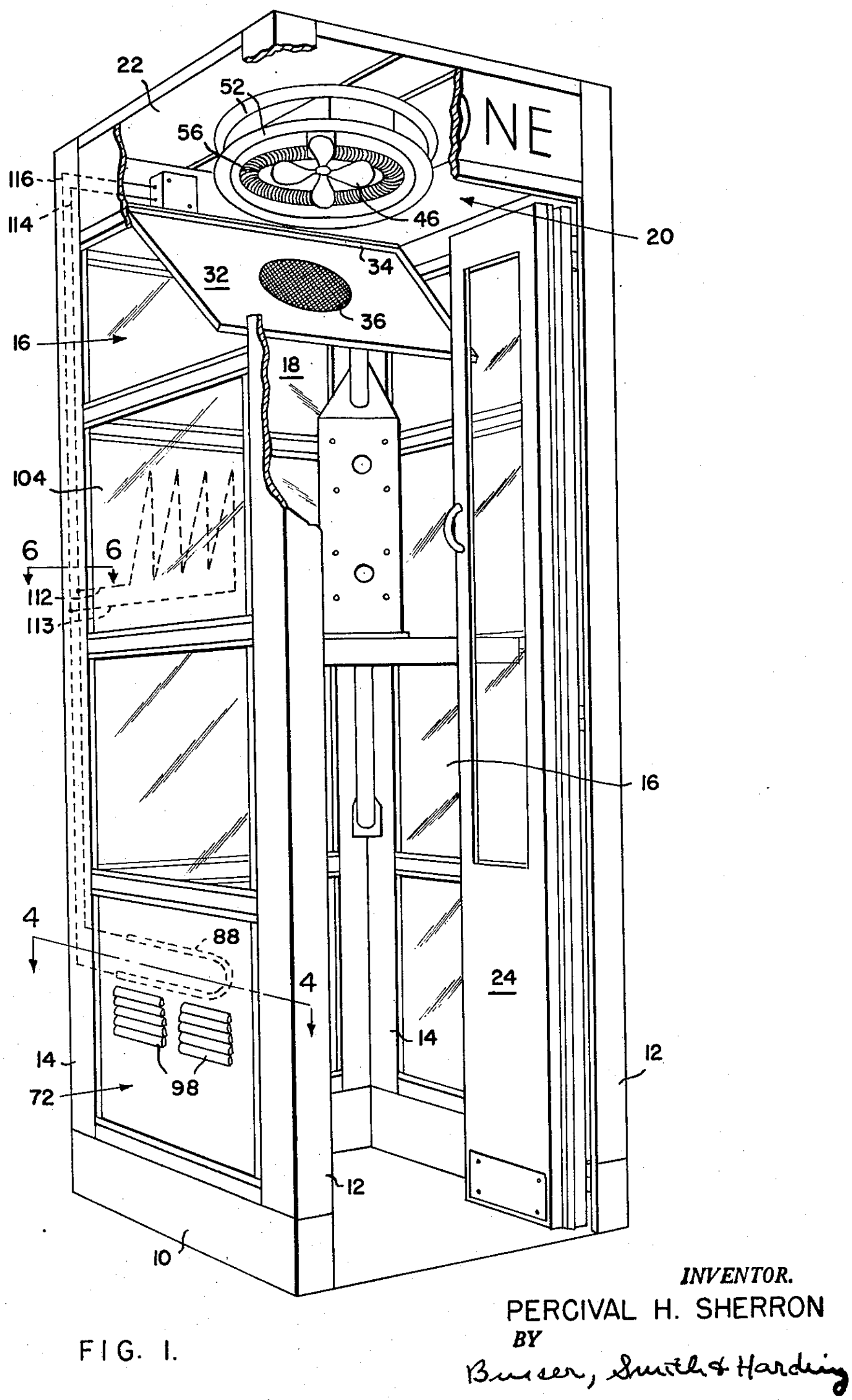
FIGURE 1 is a perspective view of a telephone booth constructed in accordance with the invention.
Figure 2:
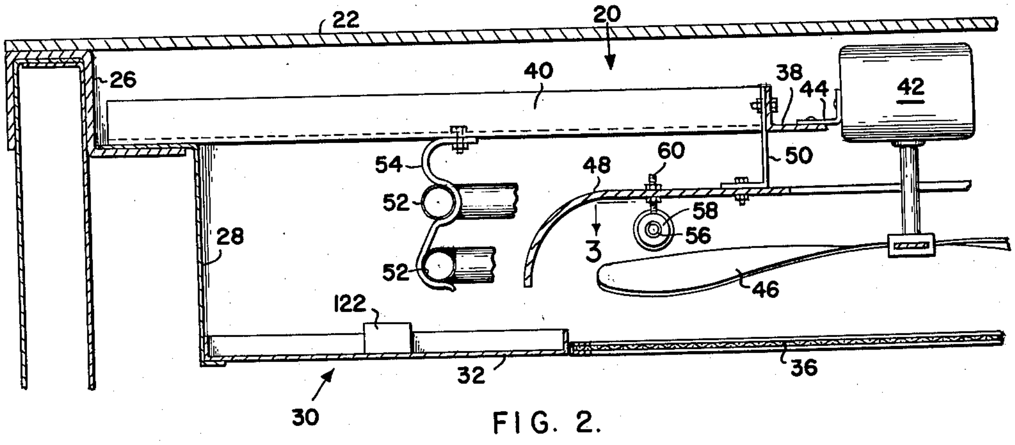
FIGURE 2 is an enlarged vertical section through the top of the booth, looking from the front to the rear of the booth.

Referring particularly to FIGURE 1, the outdoor telephone booth constructed in accordance with the invention is provided with a base 10, upright corner posts 12 at the front of the booth, upright corner posts 14 at the rear of the booth, opposite side walls, generally designated 16, a rear wall, generally designated 18, a ceiling structure, generally designated 20, a roof 22 and a door 24.

The ceiling structure 20 is supported upon the four walls of the telephone booth by means of brackets 26. The side walls of the ceiling structure, designated 28, carry a bottom panel, generally designated 30. This bottom panel accommodates a door 32 which is hinged, as at 34, and which has fitted therein a grill 36. Extending fore and aft between the brackets 26 at the front and the rear of the booth is a channel member 38, and extending between the channel 38 and each of the brackets 26 at the opposite sides of the booth is an angle member 40.

A fan motor 42 is supported upon the channel 38 through the medium of a bracket 44. The shaft of the motor extends downwardly and has mounted on the end thereof fan blades 46 above the grill 36. Extending about the motor shaft and overlying the fan blades is an annular pan 48 supported by the channel 38 through the medium of hangers 50. Embracing the pan 48 are a pair of circline fluorescent lamps 52 carried by the channel member 38 and angles 40 through the medium of suitable brackets 54.

Underlying the pan 48 is electric resistance heater means in the form of a coil 56 disposed directly above the fan blades 46 and carried by the fan 48 through the medium of annular ceramic elements 58 secured by suitable bolts 60 to the pan 48. The ends of the heating element 56 are connected respectively at 62 and 64 to conductors 66 and 68, which conductors extend through an opening 70 in the pan 48.

Figure 4:
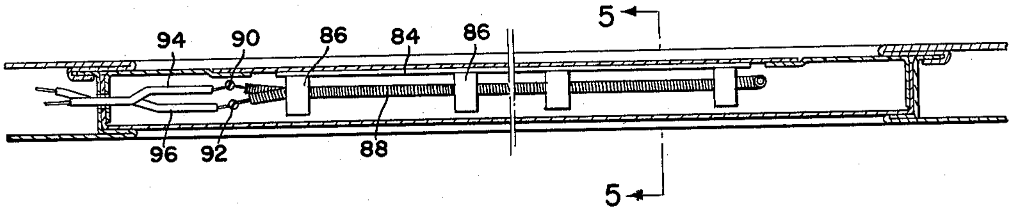
FIGURE 4 is an enlarged section on the plane indicated by line 4—4 of FIGURE 1.
Figure 5:
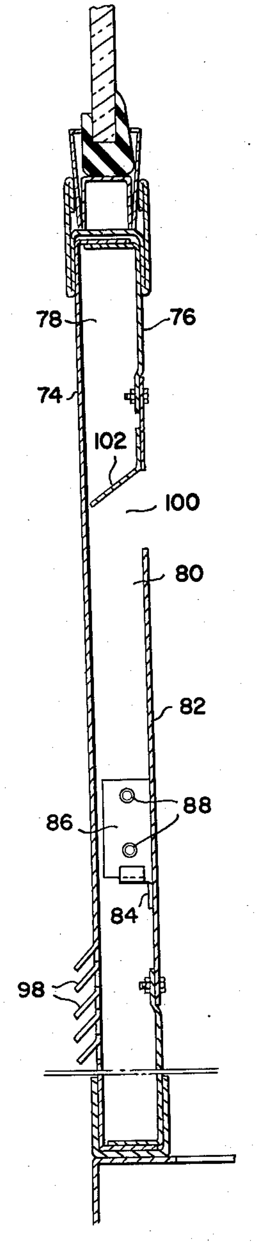
FIGURE 5 is a section on the plane indicated by line 5—5 of FIGURE 4.

Referring particularly to FIGURES 1, 4 and 5, the side wall panel, generally designated 72, comprises an outer pan 74 and an inner pan 76 having therebetween a space 78. The inner pan 76 is provided with a large opening 80 over which is removably fitted a cover 82. The latter has mounted thereon a bracket 84 adapted to carry a plurality of ceramic elements 86, which elements carry electric resistance heating means in the form of a heating element 88. The opposite ends of the heating element are connected respectively, as at 90 and 92, to conductors 94 and 96. The outer pan 74 is provided with louvers 98, and the inner pan 76 is provided with suitable openings 100 and with a baffle plate 102 immediately above the openings 100.

Figure 6:
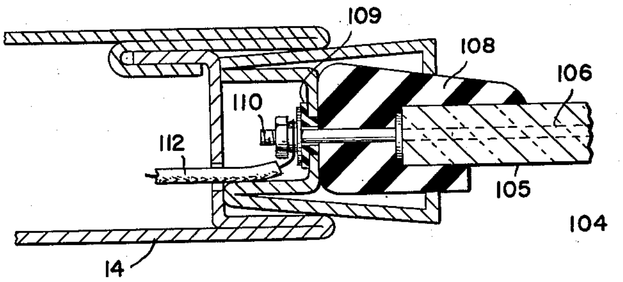
FIGURE 6 is an enlarged section on the plane indicated by line 6—6 of FIGURE 1.

Now referring particularly to FIGURES 1 and 6, the side panel, generally designated 104, comprises a plate glass member 105 having embedded therein electric resistance heating means in the form of a heating element 106 and having about the edges thereof a retainer strip 108 made of insulating material. Each end of the heating element 106 is connected to a suitable binding post member 110 passing through a thimble 109 made of insulating material and having secured thereto respectively conductors 112 and 113.

Figures 3, 7:
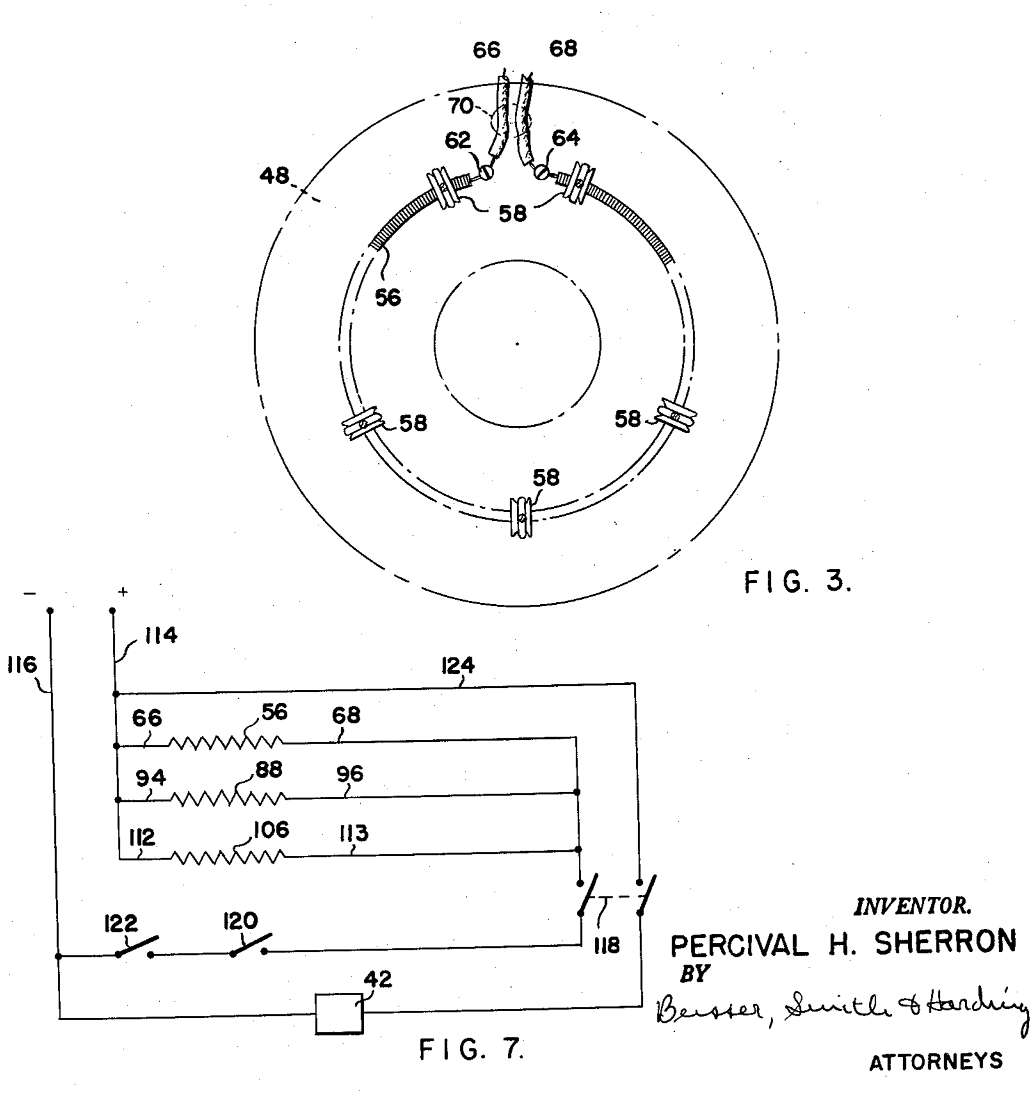
FIGURE 3 is a horizontal section on the plane indicated by the line 3—3 of FIGURE 2.
FIGURE 7 is a schematic wiring diagram.

Now referring particularly to FIGURE 7, electric current is supplied through the conductor 114 and is returned by the conductor 116. The heating elements 56, 88 and 106 are connected in parallel to one section of a switch 118 which is connected through a thermostat 120 and an on-off switch 122 to the return 116. The supply 114 is also connected to the return 116 by a conductor 124 in which is connected the other section of the switch 118 and the fan motor 42.

The switch 118 is a door-operated switch. When the door is open, the switch is open and the fan is off. When the door is closed, the switch is closed and the fan operates. In warm weather the switch 122 is open, in consequence of which operation of the door switch has no affect upon the heating elements. In cold weather the switch 122 is closed, in consequence of which when the door is open, the switch 118 is open and the heat is off. When the door is closed, the switch 118 is closed, in consequence of which the heat is on, provided, however, the thermostat 120 calls for heat.

When the heat is on, air entering the ceiling structure circulates about the coil 56 and is heated before being forced through the grill 36 into the interior of the booth. The air in the booth is heated by contact with the surface of the panel 104. Air from outside the booth enters the panel 72 through the louvers 98 and passes between the outer pan 74 and inner pan 76 over the coil 88. The heated air rises and is deflected by the baffle 102 and passes through the openings 100 into the interior of the booth.

It will be understood, of course, that any desired number of the glass panels such as 104 may be provided with heating elements and connected into the system. It will also be noted that other panels such as panel 72 may be equipped with heating elements and connected into the system. It will also be understood that it is contemplated that heating elements may be installed within the corner posts of the booth and also within the upright walls at the base. It will also be understood that any one of the basic methods of heating the booth, as by installing heating elements in the ceiling structure, embedding the same in glass panels or installing the same within a space provided within a panel may be utilized alone. Telephone booths adapted for the purpose of the invention are known in the art and therefore further details of the telephone booth per se are deemed unnecessary for a full understanding of the invention and are omitted. Reference may be had to copending U.S. Patent No. 2,925,770, issued February 23, 1960, and to copending U.S. Patent No. 2,982,196, issued May 2, 1961, for Ceiling Structures; copending U.S. Patent No. 2,988,178, issued June 13, 1961, for Hollow Corner Posts and Wall Panels; and copending U.S. Patent No. 2,995,221, issued August 8, 1961, for Plate Glass Wall Panels.

It will be understood, of course, that the present invention is susceptible of various changes and modifications which may be made without departing from the invention. For example, the pan 48 is not essential, and may be eliminated altogether. In addition, the electrical resistance heating means may take various forms. Accordingly, it is intended to claim the same broadly as well as specifically as indicated in the appended claims.

What is claimed is:

1. An outdoor telephone booth comprising a plurality of corner posts, upright wall panels extending between said corner posts, and a plurality of electrical resistance heating means, each of said heating means being housed by said panels between the outer and inner surfaces thereof and operable for heating the interior of said outdoor telephone booth, said heating means being located at various elevations throughout the height of said telephone booth, one of said wall panels including laterally spaced inner and outer plate members, one of said heating means extending between said plate members, first passageway means in said outer plate member providing communication between the exterior of the telephone booth and the space between said plate members, and second passageway means in said inner plate member providing communication between the space between said plate members and the interior of the booth.

2. A telephone booth as claimed in claim 1 wherein said first passageway means is below said one heating means extending between said plate members, said second passageway means is above said one heating means whereby air entering the interior of the booth by way of said first and second passageway means is heated by said one heating means, said inner plate member including a cover plate removably mounted on said inner plate, and said one heating means is carried by said cover plate.

3. A telephone booth as claimed in claim 2 includes a baffle plate disposed immediately above said second passageway means and mounted on said cover plate.

4. A telephone booth as claimed in claim 1 wherein another one of said wall panels comprises a plate glass member and another one of said electric resistance heating means is embedded in said glass member.

References Cited in the file of this patent

UNITED STATES PATENTS

| | | |
|---|---|---|
| 1,117,128 | Camm | Nov. 10, 1914 |
| 1,401,447 | Scott | Dec. 27, 1921 |
| 1,566,772 | Roth | Dec. 22, 1925 |
| 1,839,986 | Meldahl | Jan. 5, 1932 |
| 1,914,197 | Davis et al. | June 13, 1933 |
| 2,188,741 | Roberts | Jan. 30, 1940 |
| 2,247,028 | Kuntz | June 24, 1941 |
| 2,513,993 | Burton | July 4, 1950 |
| 2,707,426 | Cooper | May 3, 1955 |
| 2,788,648 | Sherron | Apr. 16, 1957 |
| 2,816,330 | Sherron | Dec. 17, 1957 |
| 2,870,319 | Ford | Jan. 20, 1959 |